US012707139B2

(12) United States Patent
Irie et al.

(10) Patent No.: US 12,707,139 B2
(45) Date of Patent: Aug. 11, 2026

(54) INFORMATION PROCESSING DEVICE AND INFORMATION PROCESSING METHOD

(71) Applicant: SONY GROUP CORPORATION, Tokyo (JP)

(72) Inventors: Atsushi Irie, Tokyo (JP); Junji Otsuka, Tokyo (JP); Masakazu Yoshimura, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 29 days.

(21) Appl. No.: 18/833,001

(22) PCT Filed: Jan. 16, 2023

(86) PCT No.: PCT/JP2023/000920
§ 371 (c)(1),
(2) Date: Jul. 25, 2024

(87) PCT Pub. No.: WO2023/149174
PCT Pub. Date: Aug. 10, 2023

(65) Prior Publication Data

US 2025/0159331 A1 May 15, 2025

(30) Foreign Application Priority Data

Feb. 2, 2022 (JP) ................................ 2022-014924

(51) Int. Cl.
*H04N 23/617* (2023.01)
*H04N 23/65* (2023.01)

(52) U.S. Cl.
CPC .......... *H04N 23/617* (2023.01); *H04N 23/65* (2023.01)

(58) Field of Classification Search
None
See application file for complete search history.

(56) References Cited

U.S. PATENT DOCUMENTS

2021/0352219 A1* 11/2021 Rakshit .................. H04N 23/64

FOREIGN PATENT DOCUMENTS

CN 105922990 A * 9/2016 .......... B60W 30/095
JP 2018-207222 A 12/2018
JP 2019-124538 A 7/2019
(Continued)

OTHER PUBLICATIONS

English translation of CN-105922990-A, Qi, 2016 (Year: 2016).*
(Continued)

*Primary Examiner* — James M Hannett
(74) *Attorney, Agent, or Firm* — CHIP LAW GROUP

(57) ABSTRACT

An information processing device includes a control unit. The control unit recognizes, using a learning model, a captured image captured by a sensor unit according to parameters. The control unit collects data used for updating at least one of the parameters and the learning model. The control unit updates at least one of the parameters and the learning models using the data. The control unit evaluates a recognition result of recognizing the captured image using at least one of the updated parameters and the updated learning model. The control unit recognizes the captured image by applying at least one of the updated parameters and the updated learning model according to a result of the evaluation.

13 Claims, 7 Drawing Sheets

(56) References Cited

FOREIGN PATENT DOCUMENTS

| | | | | | |
|---|---|---|---|---|---|
| JP | 2019-139734 | A | | 8/2019 | |
| JP | 2020-093760 | A | | 6/2020 | |
| JP | 2020-126535 | A | | 8/2020 | |
| JP | 2020-155063 | A | | 9/2020 | |
| JP | 2020177429 | A | * | 10/2020 | |
| JP | 2021-176032 | A | | 11/2021 | |
| JP | 2022-506395 | A | | 1/2022 | |
| WO | 2021/070215 | A1 | | 4/2021 | |
| WO | WO-2022182447 | A1 | * | 9/2022 | ........... G06F 18/214 |

OTHER PUBLICATIONS

English translation of JP-2020177429-A, Makita, 2020 (Year: 2020).*

International Search Report and Written Opinion of PCT Application No. PCT/JP2023/000920, issued on Mar. 20, 2023, 13 pages of ISRWO.

* cited by examiner

FIG. 1
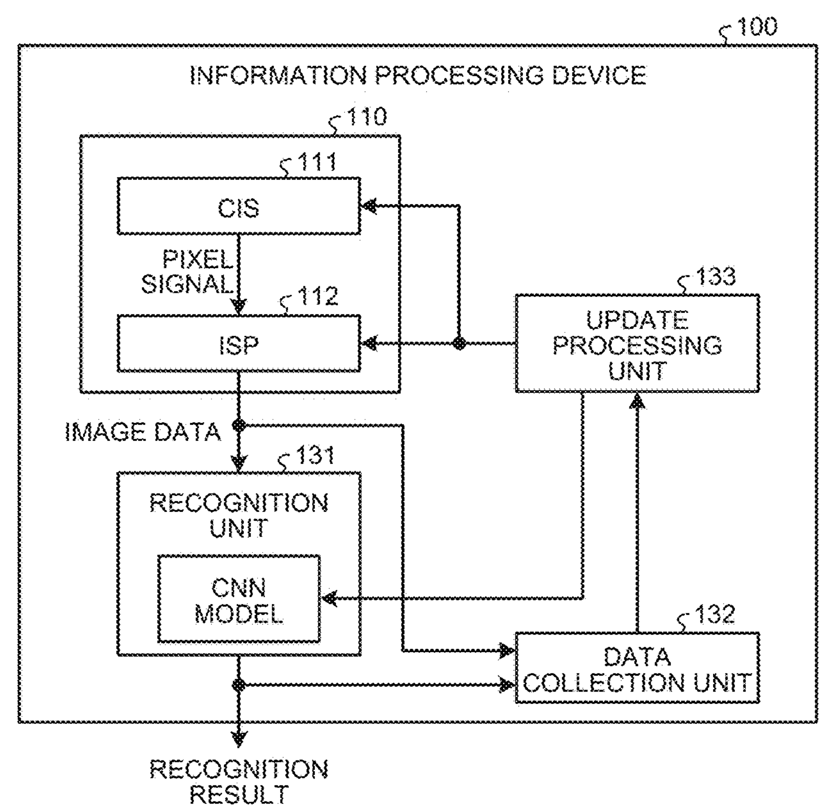
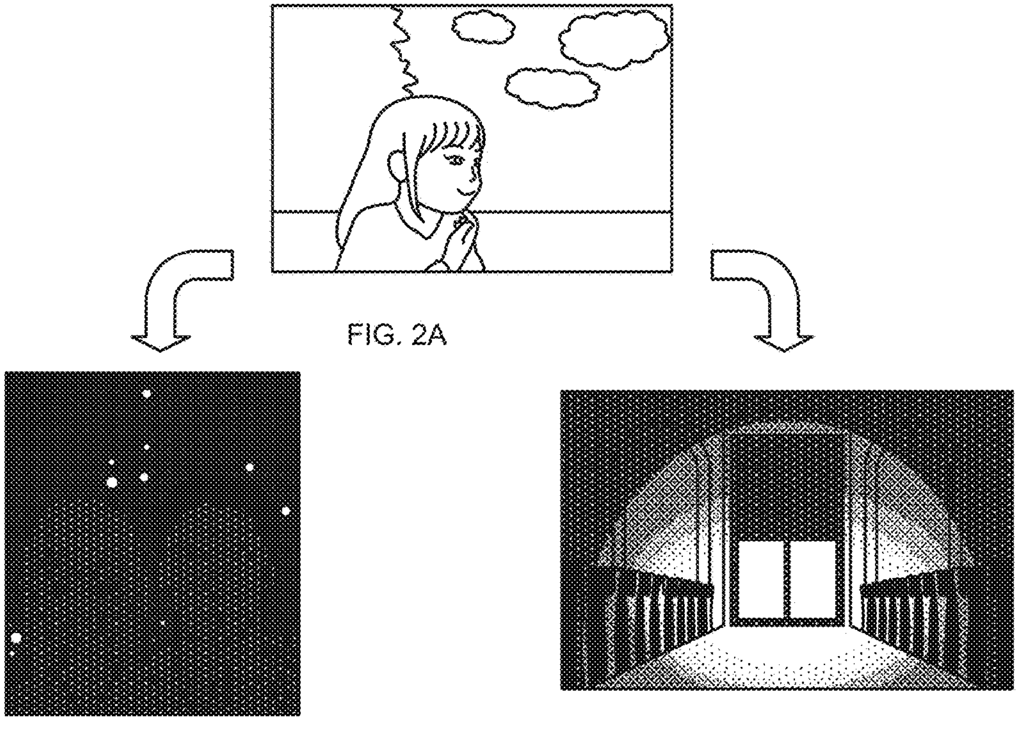
FIG. 2A
FIG. 2B
FIG. 2C

FIG.11

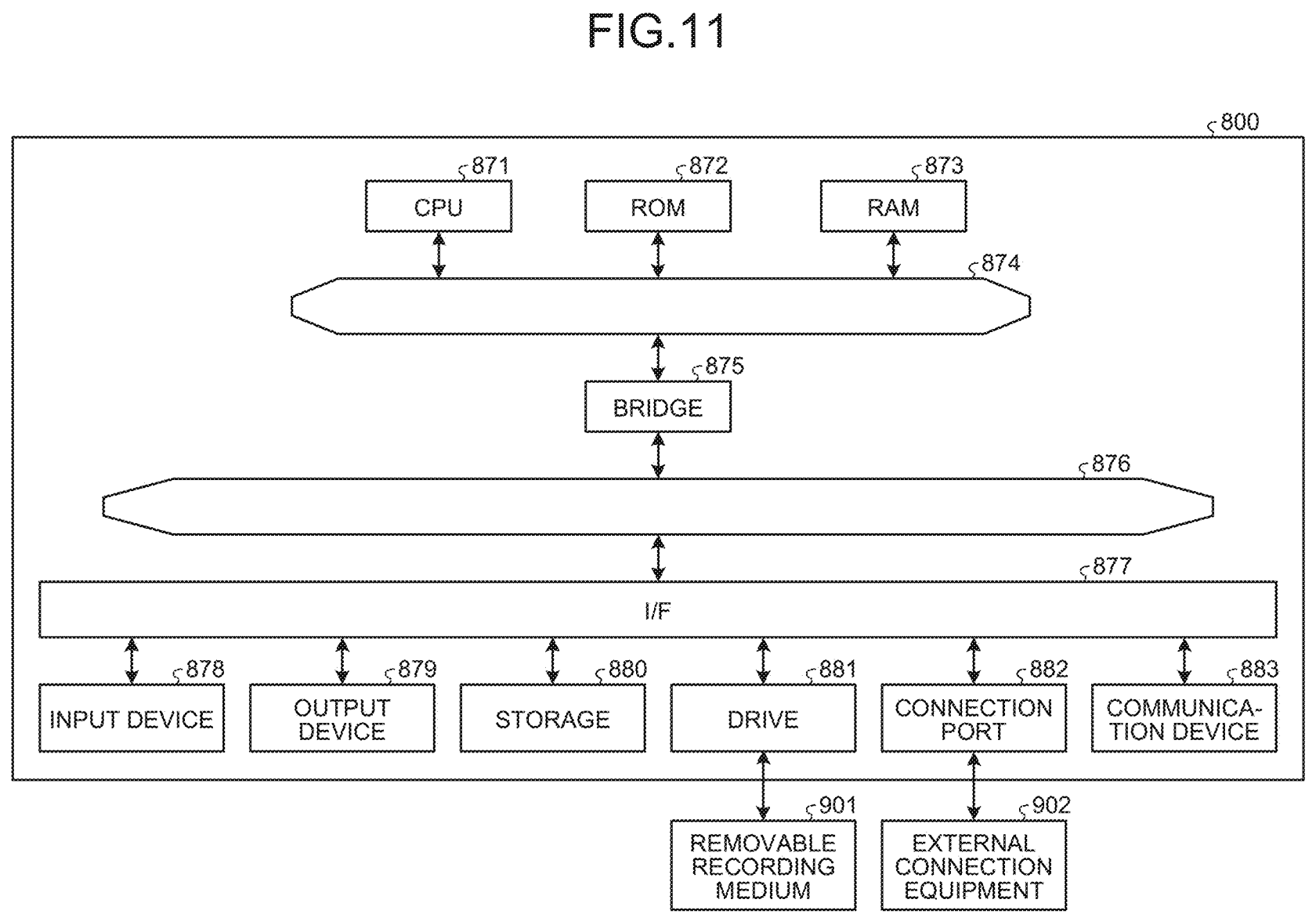

800
CPU 871
ROM 872
RAM 873
874
BRIDGE 875
876
I/F 877
INPUT DEVICE 878
OUTPUT DEVICE 879
STORAGE 880
DRIVE 881
CONNECTION PORT 882
COMMUNICATION DEVICE 883
REMOVABLE RECORDING MEDIUM 901
EXTERNAL CONNECTION EQUIPMENT 902

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2023/000920 filed on Jan. 16, 2023, which claims priority benefit of Japanese Patent Application No. JP 2022-014924 filed in the Japan Patent Office on Feb. 2, 2022. Each of the above-referenced applications is hereby incorporated herein by reference in its entirety.

FIELD

The present disclosure relates to an information processing device, an information processing method, and a program.

BACKGROUND

In recent years, there has been known a device that performs various kinds of processing based on a learning model generated using machine learning. For example, in automatic driving of a vehicle, there has been known a technique of preparing a learned model for each route or region and controlling the vehicle using the learned model. For example, there has been known a technique of generating a new version learning model on a cloud side using machine learning and downloading the new version learning model on an edge side to control equipment using the new version learning model.

CITATION LIST

Patent Literature

Patent Literature 1: JP 2020-93760 A
Patent Literature 2: JP 2019-139734 A

SUMMARY

Technical Problem

A learning model is sometimes used for recognition processing for a captured image. In this case, it is desirable to further improve accuracy when the recognition processing for the captured image is performed.

Therefore, the present disclosure provides a mechanism that can further improve the accuracy of recognition processing when recognition processing using a learning model is performed on a captured image.

Note that the problem or the object described above is merely one of a plurality of problems or objects that can be solved or achieved by a plurality of embodiments disclosed in the present specification.

Solution to Problem

An information processing device of the present disclosure includes a control unit. The control unit recognizes, using a learning model, a captured image captured by a sensor unit according to parameters. The control unit collects data used for updating at least one of the parameters and the learning model. The control unit updates at least one of the parameters and the learning models using the data. The control unit evaluates a recognition result of recognizing the captured image using at least one of the updated parameters and the updated learning model. The control unit recognizes the captured image by applying at least one of the updated parameters and the updated learning model according to a result of the evaluation.

BRIEF DESCRIPTION OF DRAWINGS

FIG. 1 is a block diagram illustrating a schematic configuration example of an information processing device according to an embodiment of the present disclosure.

FIGS. 2A, 2B, and 2C are diagrams for explaining dynamic control by the information processing device according to the embodiment of the present disclosure.

FIG. 11 is a block diagram illustrating an example of a hardware configuration of the information processing device according to the embodiment.

DESCRIPTION OF EMBODIMENT

Figure 3:
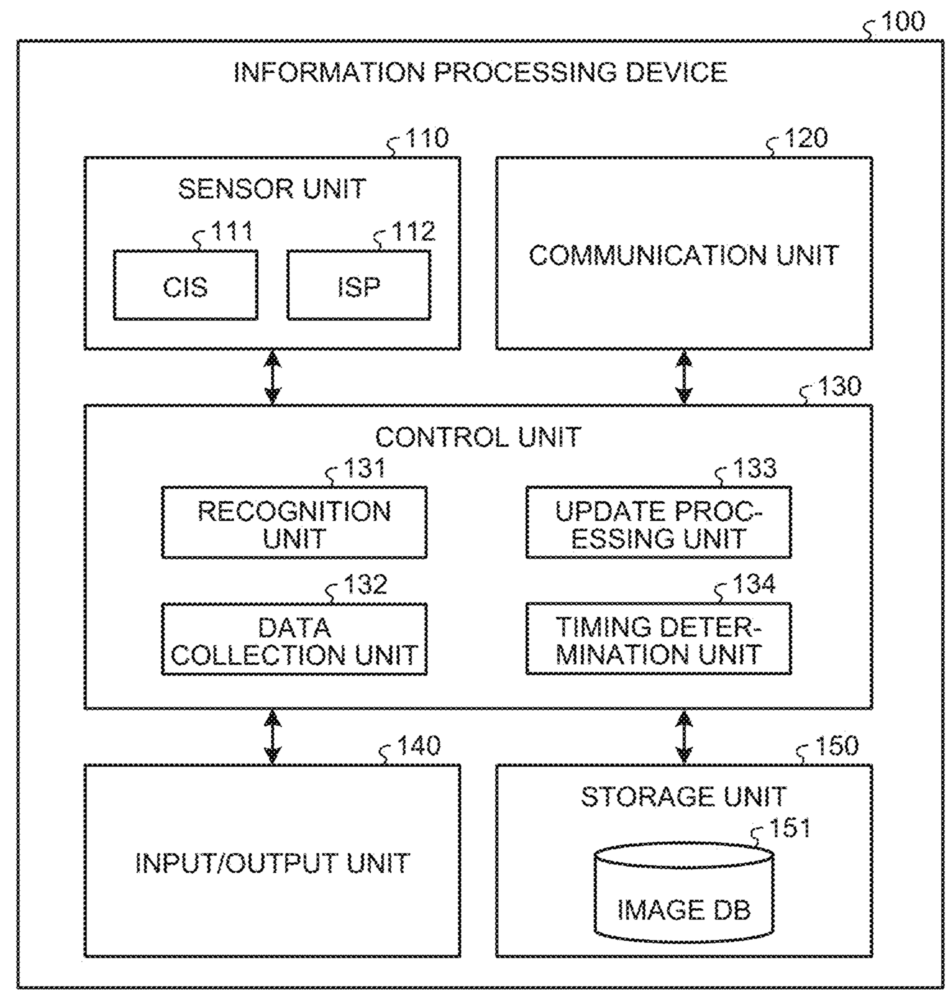
FIG. 3 is a block diagram illustrating a configuration example of the information processing device according to the embodiment of the present disclosure.

An embodiment of the present disclosure is explained in detail below with reference to the accompanying drawings. Note that, in the present specification and the drawings, components having substantially the same functional configurations are denoted by the same reference numerals and signs, whereby redundant explanation of the components is omitted.

One or a plurality of embodiments (including examples and modifications) explained below can be respectively implemented independently. On the other hand, at least a part of the plurality of embodiments explained below may be implemented in combination with at least a part of other embodiments as appropriate. These plurality of embodiments can include new characteristics different from one another. Therefore, these plurality of embodiments can contribute to solving subjects or problems different from one another and can achieve different effects.

1. Introduction

1.1. Schematic Configuration Example of an Information Processing Device

FIG. 1 is a block diagram illustrating a schematic configuration example of an information processing device 100 according to an embodiment of the present disclosure. The information processing device 100 according to the embodiment of the present disclosure performs, for example, image recognition processing on a captured image.

The information processing device 100 illustrated in FIG. 1 includes a CIS (CMOS Image Sensor) 111, an ISP (Image Signal Processor) 112, a recognition unit 131, a data collection unit 132, and an update processing unit 133.

The CIS 111 is a solid-state imaging device (an image sensor) that images the periphery of the information processing device 100 and generates a pixel signal. The CIS 111 outputs the generated pixel signal to the ISP 112.

The ISP 112 performs signal processing such as noise correction (denoise), dark correction, and tone mapping on the pixel signal generated by the CIS 111 to generate image data (a captured image). Note that the CIS 111 and the ISP 112 are collectively described as sensor unit 110 as well.

The recognition unit 131 recognizes image data using, for example, a learning model (CNN (Convolutional Neural Network) model in FIG. 1) generated by machine learning and outputs a recognition result. For example, it is assumed that, as image recognition processing, the recognition unit 131 detects an object included in image data. In this case, the recognition unit 131 detects an object from the image data by inputting the image data to the CNN model. Note that the learning model is assumed to be the CNN model here but is not limited to this. As the learning model, besides the CNN model, various machine learning models such as a DNN (Deep Neural Network) model, an RNN (Recurrent Neural Network) model, and a GAN (Generative Adversarial Network) model can be adopted.

Here, in order to further improve the recognition accuracy by the recognition unit 131, the information processing device 100 according to the embodiment of the present disclosure performs dynamic control on at least one of the sensor unit 110 and the recognition unit 131.

For example, the update processing unit 133 of the information processing device 100 dynamically updates parameters of at least one of the CIS 111 and the ISP 112 to generate image data with which recognition accuracy in the recognition unit 131 is further improved.

For example, when the recognition unit 131 fails in recognition because image data is dark, the update processing unit 133 updates the parameters of the CIS 111 such that an exposure time in the CIS 111 increases. Accordingly, the ISP 112 can generate brighter image data, and the recognition accuracy in the recognition unit 131 can be improved.

For example, when the recognition unit 131 fails in recognition because noise included in image data is strong, the update processing unit 133 updates the parameters of the ISP 112 such that noise correction in the ISP 112 strengthens. Accordingly, the ISP 112 can generate image data with less noise, and the recognition accuracy in the recognition unit 131 can be improved.

For example, the update processing unit 133 of the information processing device 100 dynamically updates the CNN model according to a recognition result in the recognition unit 131 and output of the CNN model. For example, the update processing unit 133 updates the CNN model by replacing the CNN model used in the recognition unit 131 with a CNN model in which unnecessary processing is omitted and that is optimum for an imaging environment.

1.2. Problems (Data Collection)

Here, when the information processing device 100 controls the sensor unit 110 or the CNN model, the information processing device 100 is required to perform control corresponding to a place where the information processing device 100 is used or an environment in which a user mainly uses the information processing device 100.

FIGS. 2A, 2B, and 2C are diagrams for explaining dynamic control by the information processing device 100 according to the embodiment of the present disclosure.

For example, it is assumed that the update processing unit 133 sets parameters and a CNN model optimum for a scene in which a person is imaged outdoors. In this case, as illustrated in FIG. 2A, the information processing device 100 can appropriately acquire a captured image of the person captured outdoors and can more accurately recognize the captured image.

On the other hand, for example, when the information processing device 100 performs imaging at night as illustrated in FIG. 2B, an exposure time is insufficient and the information processing device 100 is likely to fail to recognize a person included in a captured image.

For example, as illustrated in FIG. 2C, when indoor imaging is performed, a part of a captured image is sometimes overexposed by external light entering from a window or the like. As explained above, in a scene of a High Dynamic Range, it is likely that a normal dynamic range cannot cope with the scene, overexposure occurs in a captured image, and recognition accuracy of the captured image by the information processing device 100 is deteriorated.

In order to suppress such deterioration in the recognition accuracy of the captured image, the information processing device 100 is required to perform dynamic control for the sensor unit 110 and the CNN model according to a place or an environment in which the user mainly performs imaging. That is, the information processing device 100 is desired to collect optimum data according to a place or an environment in which the user uses the information processing device 100 and an individual user.

(Update Timing)

Electric power is necessary for the information processing device 100 to control (update) the parameters and the CNN model. Further, since the information processing device 100 cannot recognize a captured image while performing control, a delay (latency) occurs in recognition processing such as the object detection.

For example, it is assumed that the information processing device 100 is a mobile terminal such as a smartphone. In this case, if the information processing device 100 constantly executes the update processing for the sensor unit 110 and the CNN model, a large amount of power is consumed in the update processing, and the battery is likely to run out soon.

For example, it is assumed that the information processing device 100 is a moving body such as a drone or an automobile. In this case, if a delay occurs in the recognition processing (for example, object detection) because of the update processing, a delay also occurs in obstacle detection by the information processing device 100, and the information processing device 100 is likely to collide with an obstacle.

As explained above, power is required for the information processing device 100 to perform the update processing, and the recognition processing cannot be performed while the information processing device 100 is performing the update processing, and thus, the delay of the recognition processing increases. Therefore, it is desirable that the information processing device 100 perform the update processing at a timing at which sufficient power is supplied and the delay may increase.

(Recognition Accuracy after Update)

Furthermore, it is required that the recognition accuracy by the recognition unit 131 after the information processing device 100 updates the parameters and the CNN model is not degraded from the recognition accuracy before the update.

For example, as explained above, when the information processing device 100 is a moving body such as a drone or an automobile, if the recognition accuracy after the update becomes lower than that before the update, the detection accuracy of the obstacle may be deteriorated. If the detection accuracy of the obstacle deteriorates, the information processing device 100 may collide with the obstacle.

As explained above, the recognition accuracy of the captured image after the information processing device 100 performs the update processing is required to be equal to or higher than the recognition accuracy before the update processing.

1.3. Overview of a Proposed Technique

Therefore, the information processing device 100 according to the embodiment of the present disclosure collects data to be used for update (update processing) of at least one of the parameters of the sensor unit 110 and the CNN model (an example of the learning model). The information processing device 100 updates at least one of the parameters and the CNN model using the collected data. The information processing device 100 evaluates a recognition result of recognizing a captured image using at least one of the updated parameters and the updated CNN model. The information processing device 100 recognizes the captured image by applying at least one of the updated parameters and the updated CNN model according to the evaluation result.

Referring back to FIG. 1, the data collection unit 132 of the information processing device 100 collects data to be used for the update processing. For example, the data collection unit 132 collects image data that is output data of the sensor unit 110 and a recognition result output by the recognition unit 131.

The update processing unit 133 updates at least one of the parameters and the CNN model using the data collected by the data collection unit 132. For example, the update processing unit 133 updates at least one of the parameters and the CNN model using a learning model (hereinafter described as update model as well) that receives, as input, the data collected by the data collection unit 132 and outputs at least one of the parameters and the CNN model.

The update processing unit 133 evaluates the recognition result using at least one of the updated parameters and the updated CNN model. The update processing unit 133 applies at least one of the updated parameters and the updated CNN model to at least one of the sensor unit 110 and the recognition unit 131 according to an evaluation result. For example, as a result of the evaluation, when the updated recognition result is equal to or better than the unupdated recognition result, the update processing unit 133 applies the updated parameters and the updated CNN model to the sensor unit 110 and the recognition unit 131. Thereafter, the recognition unit 131 recognizes, using the updated CNN model, a captured image captured using the updated parameters.

As explained above, the information processing device 100 according to the embodiment of the present disclosure collects, for example, image data and data of the own device such as a recognition result as data to be used for the update processing. Accordingly, the information processing device 100 can collect optimum data according to a place or environment in which the user uses the information processing device 100 and an individual user.

The information processing device 100 evaluates the updated parameters and the updated CNN model and applies the updated parameters and the updated CNN model according to the evaluation result. Accordingly, the information processing device 100 can increase the recognition accuracy of a captured image after the update processing to be equal to or higher than the recognition accuracy before the update processing.

The information processing device 100 executes the update processing at predetermined timing such as during charging or stop of the information processing device 100. Accordingly, the information processing device 100 can perform the update processing at timing when power is sufficiently supplied and the delay may increase.

As explained above, by executing the update processing, the information processing device 100 according to the embodiment of the present disclosure can further improve the accuracy of the recognition processing when the recognition processing using the learning model (for example, the CNN model) is performed on the captured image.

2. Configuration Example of the Information Processing Device

FIG. 3 is a block diagram illustrating a configuration example of the information processing device 100 according to the embodiment of the present disclosure. In the following explanation, the information processing device 100 is explained as a mobile terminal device such as a smartphone or AR glasses but is not limited to this. For example, the information processing device 100 may be a moving body such as a drone or an automobile or may be a device mounted on the drone or the automobile.

In the following explanation, it is assumed that the information processing device 100 performs, as the recognition processing, detection processing of detecting an object included in a captured image. However, the recognition processing performed by the information processing device 100 is not limited to this. For example, the information processing device 100 may perform face recognition, scene detection, and the like as the recognition processing.

In the following explanation, the information processing device 100 performs the update processing for both of the parameters of the sensor unit 110 and the CNN model. However, the update processing is not limited to this. For example, the information processing device 100 may perform the update processing on one of the parameters of the sensor unit 110 and the CNN model. The information processing device 100 may simultaneously perform the update processing for the parameters and the update processing for the CNN model or may perform one of the update processing for the parameters and the update processing for the CNN model. That is, timing of the update processing performed by the information processing device 100 may be different for each of the parameters and the CNN model.

(Information Processing Device 100)

The information processing device 100 illustrated in FIG. 3 includes the sensor unit 110, a communication unit 120, a control unit 130, an input/output unit 140, and a storage unit 150.

(Sensor Unit 110)

The sensor unit 110 acquires, for example, information around the information processing device 100. The sensor unit 110 illustrated in FIG. 3 includes the CIS 111 and the ISP 112.

The CIS 111 is, for example, a CMOS image sensor. For example, the CIS 111 sets parameters (hereinafter described as CIS parameters as well) according to control from the control unit 130 and generates a pixel signal based on the set CIS parameters. Examples of the CIS parameters include shutter speed, an exposure time, and an analog gain.

For example, the ISP 112 performs signal processing on the pixel signal generated by the CIS 111 to generate image data (captured image). The ISP 112 is configured using, for example, a CPU (Central Processing Unit) and executes an operating system, various kinds of application software, and the like. Note that the ISP 112 may be implemented by an integrated circuit such as an ASIC (Application Specific Integrated Circuit) or an FPGA (Field Programmable Gate Array). Functions such as a GPU (Graphics Processing Unit) and a baseband processor may be mounted on the ISP 112.

The ISP 112 executes, for example, on the pixel signal, a variety of signal processing such as demosaic, various kinds of filter processing such as sharpening processing and noise removal, resolution conversion, digital gain, tone mapping (gradation correction), color correction, color conversion, normalization processing, and quantization. The ISP 112 sets, according to the control from the control unit 130, parameters to be used for the signal processing and executes the signal processing according to the set parameters. Alternatively, the ISP 112 may optimize, according to the control from the control unit 130, a combination and order of the signal processing to be executed.

Note that the sensor unit 110 includes the CIS 111, that is, the CMOS image sensor here but is not limited to this. The sensor unit 110 may include a sensor other than the CIS 111. For example, the sensor unit 110 may include an EVS (Event based Vision Sensor) and TOF (Time Of Flight). Note that the EVS is also referred to as DVS (Dynamic Vision Sensor).

The signal processing executed by the ISP 112 is not limited to the example explained above. The ISP 112 may execute any signal processing other than the signal processing explained above.

A part or all of the signal processing performed by the sensor unit 110 can be implemented using a machine learning model such as CNN.

(Communication Unit 120)

The communication unit 120 is a communication interface for communicating with other devices. For example, the communication unit 120 is a LAN (Local Area Network) interface such as an NIC (Network Interface Card). The communication unit 120 may be a wired interface or may be a wireless interface. The communication unit 120 communicates with other devices according to the control of the control unit 130.

(Control Unit 130)

The control unit 130 is a controller that controls the units of the information processing device 100. The control unit 130 is implemented by, for example, a processor such as a CPU (Central Processing Unit), an MPU (Micro Processing Unit) or a GPU (Graphics Processing Unit) For example, the control unit 130 is implemented by the processor executing various programs stored in a storage device inside the information processing device 100 using a RAM (Random Access Memory) or the like as a work area. Note that the control unit 130 may be implemented by an integrated circuit such as an ASIC (Application Specific Integrated Circuit) or an FPGA (Field Programmable Gate Array). All of the CPU, the MPU, the GPU, the ASIC, and the FPGA can be regarded as the controller.

The control unit 130 includes the recognition unit 131, the data collection unit 132, the update processing unit 133, and a timing determination unit 134. Blocks (the recognition unit 131 to the timing determination unit 134) configuring the control unit 130 are respectively functional blocks indicating functions of the control unit 130. These functional blocks may be software blocks or may be hardware blocks. For example, the functional blocks explained above may be one software module implemented by software (including a microprogram) or may be one circuit block on a semiconductor chip (a die). Naturally, each of the functional blocks may be one processor or one integrated circuit. The control unit 130 may be configured in functional units different from the functional blocks explained above. A configuration method for the functional blocks is optional.

Note that the control unit 130 may be configured in functional units different from the functional blocks explained above. Another device may perform operations of a part or all of the blocks (the recognition unit 131 to the timing determination unit 134) configuring the control unit 130. The operations of the blocks configuring the control unit 130 are explained below.

(Input/Output Unit 140)

The input/output unit 140 is a user interface for exchanging information with the user. For example, the input/output unit 140 is an operation device for the user to perform various kinds of operation such as a keyboard, a mouse, an operation key, and a touch panel. Alternatively, the input/output unit 140 is a display device such as a liquid crystal display or an organic EL display (Organic Electroluminescence Display). The input/output unit 140 may be an acoustic device such as a speaker or a buzzer. The input/output unit 140 may be a lighting device such as an LED (Light Emitting Diode) lamp.

(Storage Unit 150)

The storage unit 150 is implemented by, for example, a semiconductor memory element such as a RAM (Random Access Memory), a ROM (Read Only Memory), or a flash memory or a storage device such as a hard disk or an optical disk.

The storage unit 150 illustrated in FIG. 3 includes an image DB (database) 151. The image DB 151 stores, for example, image data collected by the data collection unit 132. The image data stored in the image DB 151 is explained below.

3. Information Processing

Figure 4:
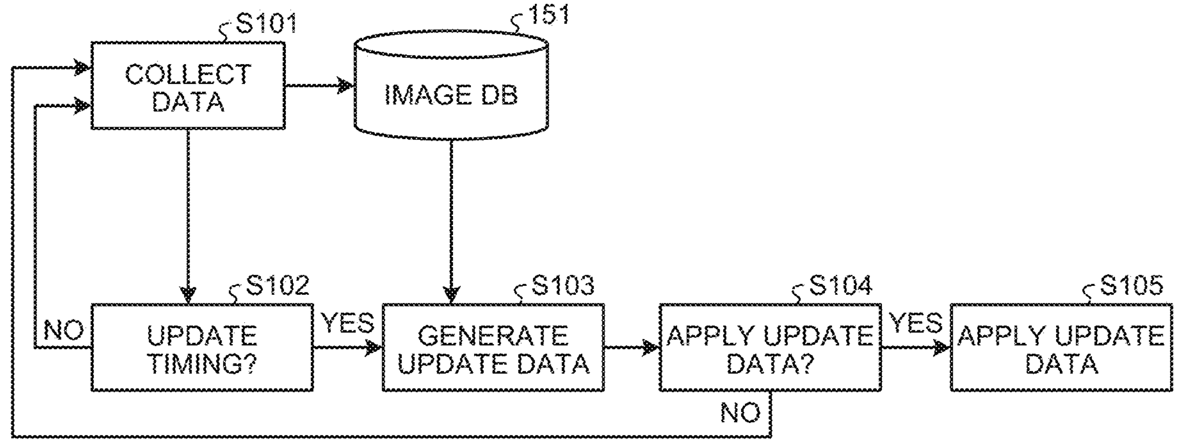
FIG. 4 is a diagram for explaining a flow of an example of information processing executed by the information processing device according to the embodiment of the present disclosure.

FIG. 4 is a diagram for explaining a flow of an example of information processing executed by the information processing device 100 according to the embodiment of the present disclosure.

As illustrated in FIG. 4, the information processing device 100 collects data used for update of parameters of the sensor unit 110 and a CNN model (Step S101). The data collection is performed by, for example, the data collection unit 132 illustrated in FIGS. 2A, 2B, and 2C. As illustrated in FIG. 4, the data collection unit 132 stores the collected data (for example, image data) in the image DB 151.

Subsequently, the information processing device 100 determines whether it is update timing for performing update processing for the parameters and the CNN model (Step S102). The determination as to whether it is the update timing is performed by, for example, the timing determination unit 134 illustrated in FIGS. 2A, 2B, and 2C.

As illustrated in FIG. 4, when it is not the update timing (Step S102; No), the information processing device 100 returns to Step S101 and collects data. On the other hand, when it is the update timing (Step S102; Yes), the information processing device 100 generates update data (Step S103). The update data generation is performed by the update processing unit 133 illustrated in FIGS. 2A, 2B, and 2C. The update processing unit 133 uses, for example, the data stored in the image DB 151 to generate the updated parameters and the updated CNN models as update data.

The information processing device 100 determines whether to apply the update data generated in Step S103 in FIG. 4 (Step S104). This determination is performed by, for example, the update processing unit 133 illustrated in FIGS. 2A, 2B, and 2C. For example, the update processing unit 133 determines whether to apply the update data according to, when the update data is applied, how the accuracy of a recognition result by the recognition unit 131 changes compared with that before the application.

When the update processing unit 133 determines to update the update data (Step S104; Yes), the information processing device 100 applies the update data to the sensor unit 110 and the recognition unit 131 (Step S105). Specifically, in this case, the update processing unit 133 notifies the updated parameters, which are the update data, to the sensor unit 110. The update processing unit 133 replaces the CNN model used by the recognition unit 131 with the updated CNN model. On the other hand, when the update processing unit 133 determines not to update the update data (Step S104; No), the information processing device 100 returns to Step S101 and collects data.

(Data Collection Processing)

As explained above, the information processing device 100 collects data used to generate update data. In the following explanation, data collected by the information processing device 100 for the update processing is described as processing data as well.

As explained above, the information processing device 100 collects the processing data according to a place, an environment, a scene, or the like in which the user uses the information processing device 100. For example, the information processing device 100 acquires the processing data necessary for the update processing according to conditions and situations.

Specifically, the information processing device 100 collects the processing data in a place or scene that is the same as or similar to a place or scene where the user uses an application (hereinafter described as use application as well) that uses a result of object detection by the recognition unit 131.

For example, the information processing device 100 stores conditions and situations in which the use application was used such as a place (position information) where the use application was used, time, weather, an angle of the information processing device 100, and a type of an object detected by the recognition unit 131. The information processing device 100 collects, as the processing data, for example, image data generated by the sensor unit 110 under conditions or situations, at least one of which is the same as a stored plurality of conditions and situations. Alternatively, the information processing device 100 collects, as the processing data, for example, image data generated by the sensor unit 110 under conditions or situations similar to the stored plurality of stored conditions or situations.

For example, the information processing device 100 collects, as the processing data, image data generated by the sensor unit 110 when an application similar to the use application is used. For example, it is assumed that the use application is an image editing application that edits image data generated by the sensor unit 110. In this case, for example, the information processing device 100 collects, as the processing data, image data generated by the sensor unit 110 while the user used a game application that uses the image data generated by the sensor unit 110 as well. For example, the information processing device 100 collects the processing data when an application that performs at least one of generation of image data and object detection using the CNN model is executed using the sensor unit 110.

For example, the information processing device 100 collects, as the processing data, image data generated by the sensor unit 110 in a situation that is the same as or similar to a situation of the information processing device 100 at the when the use application is executed. The information processing device 100 stores, as a use situation of the information processing device 100, for example, a usage rate of a CPU (or a GPU) at the time when the use application is executed, information acquired by a gyro sensor mounted on the own device, and information acquired by an illuminance sensor mounted on the own device. The information processing device 100 collects, as the processing data, for example, image data generated by the sensor unit 110 in a situation that is the same as or similar to the stored situation.

The information processing device 100 collects the image data generated by the sensor unit 110 as the processing data here but is not limited to this. For example, the information processing device 100 can collect the processing data from the cloud.

In this case, the information processing device 100 collects, as the processing data, for example, image data captured by an imaging person having an attribute similar to an attribute of the user or image data captured by a device having specifications similar to specifications of the information processing device 100.

The information processing device 100 determines whether the attribute of the user is similar to the attribute of the imaging person according to, for example, age, sex, a hobby, an occupation, a country or region of residence, an action track (an action history).

The information processing device 100 collects, as the processing data, image data captured by a device having the same specifications as the specifications of the own device or a sensor having the same specifications as the specifications of the sensor unit 110.

Note that, here, when the conditions and the situations being similar means that, in the case of data, conditions and situations of which are represented by values, a case in which the values are within a predetermined range.

As explained above, the information processing device 100 collects, as the processing data, the image data captured in the situations similar to the situations of the use application, the image data captured by the imaging person having the attribute similar to the attribute of the user, and the like. Accordingly, the information processing device 100 can collect the processing data for generating update data optimum for an individual user.

Note that, here, the information processing device 100 collects, as the processing data, the image data captured under the similar conditions and situations, for example, when an application similar to the use application is used. However, the information processing device 100 is not limited to this.

For example, the information processing device 100 may collect the processing data while executing the use application. In this case, the information processing device 100 may collect, as the processing data, image data captured by the user or may collect, as the processing data, image data captured by changing the parameters of the sensor unit 110.

When the parameters of the sensor unit 110 are changed and image data is collected, the information processing device 100 performs imaging, for example, while changing shutter speed and an analog gain of the CIS 111 and collects the processing data.

Alternatively, the information processing device 100 can collect image data by changing a situation (a state) of the own device. For example, the information processing device 100 may perform imaging in a state in which the temperature of the own device is raised and collect the processing data.

The information processing device 100 can change the parameters and the state of the own device according to, for example, update data generated in update processing in a later stage. For example, the information processing device 100 can change shutter speed and perform imaging in order to increase detection accuracy or control an analog gain and perform imaging in order to create a CNN model that can perform the object detection even when the analog gain is changed. The information processing device 100 can raise the temperature of the own device and perform imaging in order to create a CNN model that can perform the object detection even if the temperature of the own device is high. Note that the information processing device 100 can change the parameters and the state of the own device, for example, according to an instruction from the update processing unit 133 illustrated in FIGS. 2A, 2B, and 2C.

Note that the information processing device 100 changes the parameters and the state of the own device here but is not limited to this. For example, the information processing device 100 may instruct (request) the user to change the state of the own device.

For example, the information processing device 100 instructs the user to change the shooting angle and position. Alternatively, the information processing device 100 may instruct the user of the subject to be imaged. After the change of the user, the information processing device 100 performs imaging and collects processing data. At this time, the information processing device 100 can collect the processing data while changing the parameters of the sensor unit 110 and the state of the own device. As a result, the information processing device 100 can more efficiently collect processing data for optimizing (updating) the parameters of the sensor unit 110.

As explained above, the information processing device 100 collects the processing data in a state in which the information processing device 100 is executing the use application. Accordingly, the information processing device 100 can collect the processing data for generating update data optimum for a use situation (a site) of the use application.

Note that the information processing device 100 may collect the processing data at timing when the sensor unit 110 generates image data or may collect the processing data at other timing. For example, when the sensor unit 110 stores the image data in the storage unit 150, the information processing device 100 can collect, at any timing, as the processing data, data stored in the storage unit 150.

For example, the information processing device 100 can collect the processing data at a predetermined period such as every several tens of minutes. The information processing device 100 can collect the processing data according to fluctuation in the conditions and the situations explained above. For example, the information processing device 100 can collect the processing data when ambient brightness has fluctuated. The information processing device 100 can collect the processing data when the own device has moved (for example, blurred or blurred image data has been generated).

For example, the information processing device 100 can determine timing for collecting the processing data using, for example, weather forecast information acquired via a network (not illustrated). For example, when weather forecast is cloudy and a shadow is likely to be reflected in image data or when the weather forecast is rainy and raindrops are likely to be reflected in the image data, the information processing device 100 collects the processing data.

For example, the information processing device 100 can collect the processing data according to a result of the object detection performed by the recognition unit 131. When the recognition unit 131 has detected an object, the information processing device 100 collects, as the processing data, image data used to detect the object. Note that the information processing device 100 can execute the object detection by the recognition unit 131 regardless of an application being executed and collect processing data when the recognition unit 131 has detected an object. As explained above, the information processing device 100 can collect the processing data when the recognition unit 131 detects an object in the back without being known by the user.

The information processing device 100 can collect the processing data at timing when there is no problem even if electric power is consumed such as during charging. As explained below, for example, the information processing device 100 can execute update processing. In this case, the information processing device 100 can simultaneously execute processing of collecting processing data and the update processing.

(Update Timing)

Subsequently, the information processing device 100 executes update processing when it is the update timing. For example, when charging is performed, the information processing device 100 determines that there is no problem even if electric power is consumed and determines that it is the update timing for executing the update processing. As explained above, the information processing device 100 executes the update processing at timing corresponding to electric power of the own device.

Alternatively, when there is no problem even if a delay occurs in the recognition processing by the recognition unit 131 because of the update processing, the information processing device 100 determines that it is the update timing. As explained above, the information processing device 100 executes the update processing at timing corresponding to a delay required for the object detection.

For example, when the use application is in a predetermined state while being executed, the information processing device 100 determines that it is the update timing. Specifically, when the sensor unit 110 is in a state in which imaging is stopped during execution of the use application, for example, when the user is opening a setting screen of the use application, the information processing device 100 determines that it is the update timing.

Alternatively, when an application that does not use a result of the object detection by the recognition unit 131 is being executed or when a use application, an operation system, or the like is being updated, the information processing device 100 determines that it is the update timing.

As explained above, the information processing device 100 executes the update processing at timing when the result of the object detection by the recognition unit 131 is not used. Accordingly, the information processing device 100 can execute the update processing without worrying about a delay (latency) in the object detection.

Note that, for example, when the information processing device 100 is a moving body (or a device mounted on the moving body) such as a drone or an automobile, the information processing device 100 may execute the update processing according to, in addition to the delay of the detection processing, whether there are few surrounding hazards.

For example, when the information processing device 100 is an automobile, when a signal is stopped, or when the vehicle is parked in a parking lot, when the vehicle is being washed, the information processing device 100 determines that it is the update timing.

The information processing device 100 determines a state (for example, stopped, parked, or washed) of the own device based on the moving speed of the own device, the image data generated by the sensor unit 110, and the like. The information processing device 100 determines, according to the state of the own device, whether it is the update timing.

For example, when the information processing device 100 is a drone, the information processing device 100 can determine, when the drone is not flying, for example, before takeoff or after landing, that it is the update timing. When determining that there is no obstacle in the periphery, the information processing device 100 can determine that it is the update timing. The information processing device 100 determines, based on distance information around the drone, whether there is an obstacle in the periphery. As explained above, the information processing device 100 can execute the update processing, for example, even during flight by executing the update processing when there is no obstacle in the periphery.

(Update Processing)

When determining that it is the update timing, the information processing device 100 executes the update processing. The update processing includes generation processing of generating update data, evaluation processing of evaluating the generated update data, and application processing of applying the update data.

(Generation Processing)

The information processing device 100 executes generation processing using the processing data. The information processing device 100 executes the generation processing to generate updated parameters and an updated CNN model as update data.

Figure 5:
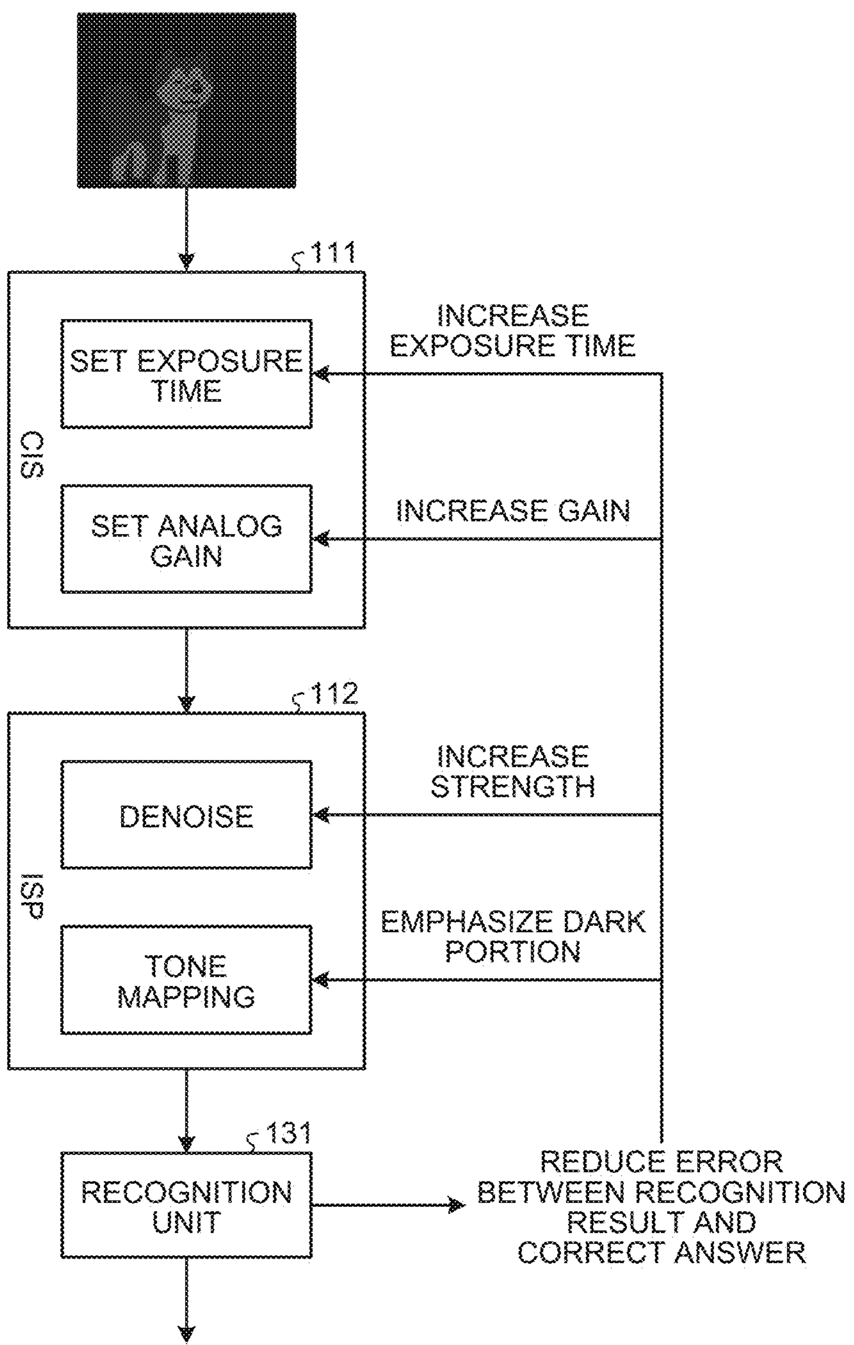
FIG. 5 is a diagram for explaining an example of generation processing according to the embodiment of the present disclosure.

FIG. 5 is a diagram for explaining an example of generation processing according to the embodiment of the present disclosure. FIG. 5 illustrates an example in which the information processing device 100 updates the parameters of the CIS 111 and the ISP 112. Here, as illustrated in FIG. 5, it is assumed that the recognition unit 131 cannot accurately detect an object because image data is dark, has a lot of noise, and has low contrast.

For example, the information processing device 100 acquires a recognition result from the recognition unit 131 and calculates parameters for reducing an error between the recognition result and a correct answer. For example, when the image data is dark and the recognition unit 131 has failed in the object detection, the information processing device 100 determines the parameters of the CIS 111 and the ISP 112 such that the object can be detected.

In the example illustrated in FIG. 5, the information processing device 100 determines the parameters of the CIS 111 such that an exposure time increases and an analog gain increases. The information processing device 100 determines parameters of the ISP 112 such that the intensity of denoise increases. The information processing device 100 determines gradation conversion parameters such that a dark portion is emphasized in tone mapping.

These updated parameters are applied (set) to the CIS 111 and the ISP 112 at the time of the application processing according to an evaluation result at the time of the evaluation processing.

The information processing device 100 can determine the updated parameters using, for example, the update model. Note that to which degree the parameters are actually updated can depend on characteristics of the CNN model. For example, when the CNN model is a machine learning model learned according to image data captured in a dark place, it is likely that the recognition accuracy of the recognition unit 131 is higher when the information processing device 100 does not perform operation of generating a bright image (generation of updated parameters). In such a case, the information processing device 100 may not update (optimize) the parameters of the sensor unit 110.

The information processing device 100 updates (or optimizes), for example, a CNN model used by the recognition unit 131 for the object detection. For example, the information processing device 100 performs weight reduction such as pruning as the optimization of the CNN model. Alternatively, the information processing device 100 generates an optimum CNN model corresponding to an imaging environment. As explained above, the information processing device 100 executes the generation processing to generate the optimized CNN model as an updated CNN model.

(Evaluation Processing)

The information processing device 100 that has generated the update data (the updated parameters and the updated CNN model) executes evaluation processing and determines whether to apply the update data. The information processing device 100 performs evaluation processing using data (hereinafter described as evaluation data as well) corresponding to at least one of an environment in which the sensor unit 110 performs imaging and the user. The information processing device 100 compares a result (detection accuracy) obtained by performing the object detection on the captured image using the update data with a result (detection accuracy) obtained by performing the object detection on the captured image using the unupdated data (the unupdated parameters and the unupdated CNN model). When detection accuracy in the case in which the update data is used is equal to or higher than detection accuracy in the case in which the unupdated data is used, the information processing device 100 determines to apply the update data.

(Evaluation Method 1)

For example, the information processing device 100 evaluates update data using evaluation data prepared in advance. The evaluation data is data with a correct answer label. It is assumed that the evaluation data is stored in advance in, for example, the storage unit 150. It is assumed that a data amount (the number of pieces or an image size) of the evaluation data is smaller compared with the processing data used for the update data.

The information processing device 100 calculates accuracy (hereinafter described as post-update accuracy as well) in the case in which the object detection for the evaluation data is performed using the update data. The information processing device 100 calculates accuracy (hereinafter described as pre-update accuracy as well) in the case in which the object detection for the evaluation data is performed using the unupdated data. The information processing device 100 compares the calculated accuracies and, when the accuracy in the case in which the update data is used is equal to or higher than the accuracy in the case in which the unupdated data is used, determines to apply the update data.

As explained above, the information processing device 100 calculates the accuracy using the evaluation data with the correct answer label. Accordingly, an error included in the calculated accuracy can be further reduced.

Note that the evaluation data explained above is stored in the storage unit 150 in advance but is not limited to this. For example, the information processing device 100 can download evaluation data stored in a cloud server or the like and calculate accuracy.

(Evaluation Method 2)

In the evaluation method 1 explained above, the information processing device 100 evaluates the update data using the evaluation data stored in advance. As explained above, when the evaluation data stored in advance is used, the evaluation data is sometimes different from image data (hereinafter described as site data as well) actually recognized by the information processing device 100. Therefore, in the object detection using the update data, the object detection can be accurately performed for the evaluation data. However, it is likely that the object detection cannot be accurately performed for the image data captured by the sensor unit 110. That is, it is likely that the update data cannot provide optimum object detection for the site data.

Therefore, in the evaluation method 2, the information processing device 100 evaluates the update data using the image data (hereinafter described as imaging evaluation data as well) actually captured by the information processing device 100.

For example, the information processing device 100 collects, as imaging evaluation data, image data for which object detection by the use application has been determined as successful. For example, it is assumed that the use application is a login authentication application using face authentication. In this case, when succeeding in login authentication by the use application, the information processing device 100 determines that face detection for the user has been successful and collects image data used for the authentication as the imaging evaluation data.

Alternatively, it is assumed that the use application is an imaging application. It is assumed that the imaging application presents information concerning a person included in the image data to the user. The user designates the person to set automatic exposure (AE) or autofocus (AF) for the person. In this case, when the user designates the person detected by the use application, the information processing device 100 determines that the detection of the person has been successful and collects the image data as the imaging evaluation data.

The information processing device 100 evaluates the update data using the collected imaging evaluation data. For example, the information processing device 100 compares a result of performing the object detection for the imaging evaluation data using the update data and a result of performing the object detection for the imaging evaluation data using the unupdated data. When the detection results before and after the update match, the information processing device 100 determines to apply the update data.

As explained above, the information processing device 100 performs the evaluation processing using the imaging evaluation data actually captured by the own device. Accordingly, the information processing device 100 can perform the evaluation processing using data more suitable for the own device and the user.

The information processing device 100 uses, as the imaging evaluation data, the image data for which object detection by the use application has been determined as successful. Accordingly, the information processing device 100 can perform the evaluation processing using image data having correct answer information.

Note that, here, the information processing device 100 collects the imaging evaluation data when a trigger such as authentication success or person detection success occurs at the time of execution of the use application. However, the information processing device 100 is not limited to this. When determining at the time of execution of an application other than the use application that the object detection by the CNN model has been successful, the information processing device 100 can collect, as the imaging evaluation data, image data used for the object detection.

(Evaluation Method 3)

In the evaluation method 2 explained above, the information processing device 100 compares the result of the object detection using the update data with the result of the object detection using the unupdated data. That is, in the evaluation method 2, it is also considered that the information processing device 100 generates the image data (the imaging evaluation data) with the correct answer label.

Therefore, in an evaluation method 3, the information processing device 100 compares the result of the object detection using the update data with a result of another CNN model (hereinafter described as evaluation model as well).

Figure 6:
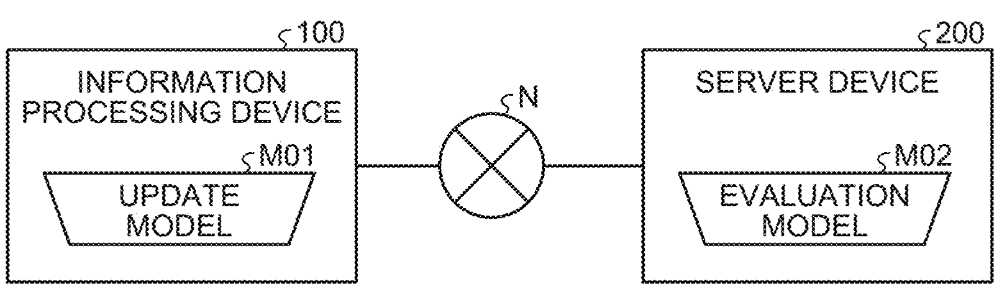
FIG. 6 is a diagram for explaining evaluation processing according to the embodiment of the present disclosure.

FIG. 6 is a diagram for explaining the evaluation processing according to the embodiment of the present disclosure. As illustrated in FIG. 6, the information processing device 100 is connected to a server device 200 via the network N.

The information processing device 100 generates the update data as explained above. Here, the updated CNN model in the update data is described as update model M01. The information processing device 100 transmits the collected processing data to the server device 200.

The server device 200 is, for example, the cloud server. For example, the server device 200 generates an evaluation model M02 using processing data received from the information processing device 100. Note that the server device 200 may update (or optimize) the generated evaluation model M02 using the processing data.

Here, it is assumed that the evaluation model M02 is a learning model learned using the same data as the CNN model included in the information processing device 100 but is a learning model having the same structure as the CNN model or structure larger than the CNN model.

For example, the server device 200 collects processing data from a plurality of information processing devices 100 and generates the evaluation model M02.

As explained above, the server device 200 can generate the evaluation model M02 using the processing data larger in number and more abundant in variations than the processing data of the information processing device 100. That is, the server device 200 can generate the evaluation model M02 using data more general than the processing data of the information processing device 100.

The server device 200 may generate the evaluation model M02 having the same structure as the CNN model using general data. In this case, in an environment in which the user of the information processing device 100 uses the information processing device 100, the accuracy of the evaluation model M02 is likely to be slightly deteriorated.

On the other hand, the accuracy of the evaluation model M02 in the case in which the general data is used increases.

Therefore, for example, the information processing device 100 performs object detection for the imaging evaluation data using the update data. The information processing device 100 demands the server device 200 to perform the object detection for the imaging evaluation data. The server device 200 performs, using the evaluation model M02, the object detection for the imaging evaluation data collected by the information processing device 100 and notifies a detection result to the information processing device 100.

The information processing device 100 compares the result of the object detection using the update data and the detection result acquired from the server device 200 and, when the results match, determines to apply the update data.

Note that, when the imaging evaluation data is general data (or close to the general data), the information processing device 100 may execute evaluation processing using the evaluation model M02 of the server device 200. Here, the general data is image data in which luminance distribution is close to an average of a luminance distribution of the processing data stored by the server device 200.

As explained above, when acquiring the general data, the information processing device 100 evaluates the update data using the detection result of the server device 200. Accordingly, the information processing device 100 can update the parameters and the CNN model without deteriorating the accuracy of the object detection.

The server device 200 can generate the evaluation model M02 having larger structure compared with the information processing device 100. Although it is difficult to mount the evaluation model M02 having large structure on a terminal device such as the information processing device 100, the accuracy of the object detection is high.

Therefore, for example, the information processing device 100 performs object detection for the imaging evaluation data using the update data. The information processing device 100 demands the server device 200 to perform the object detection for the imaging evaluation data. The server device 200 performs, using the evaluation model M02, the object detection for the imaging evaluation data collected by the information processing device 100 and notifies a detection result to the information processing device 100.

The information processing device 100 compares the result of the object detection using the update data and the detection result acquired from the server device 200 and, when the results match, determines to apply the update data.

As explained above, the information processing device 100 evaluates the update data using the evaluation model M02 having larger structure. Accordingly, the information processing device 100 can update the parameters and the CNN model without deteriorating the accuracy of the object detection.

Note that the server device 200, which is the cloud server, generates the evaluation model M02 here but is not limited to this. Besides the server device 200, for example, an information processing device such as a PC (Personal Computer) may generate the evaluation model M02. In this case, the information processing device 100 can be connected to, via wire or radio, an information processing device that generates the evaluation model M02 and can evaluate the update data.

(Evaluation Method 4)

In the evaluation methods 2 and 3 explained above, the information processing device 100 evaluates the update data using the results of the object detection by the unupdated CNN model and the unupdated evaluation model M02.

Therefore, if the accuracy of the unupdated CNN model or the unupdated evaluation model M02 is low, the accuracy of the update data is likely to be deteriorated.

Therefore, in the evaluation method 4, the information processing device 100 performs the evaluation processing using a task in which correct data can be obtained. Note that the task (hereinafter described as evaluation task as well) is a task different from a task (hereinafter described as use task as well) executed by the use application. Examples of the use task include an image generation task and an image editing task. Examples of the evaluation task include a task of generating a distance image (an example of a first distance image) from image data (for example, RGB data). For example, when a distance measuring device (a depth sensor) such as a TOF (not illustrated) is mounted on the information processing device 100, the information processing device 100 can determine, using a distance measurement result by the TOF, whether a generated distance image is correct.

Figure 7:
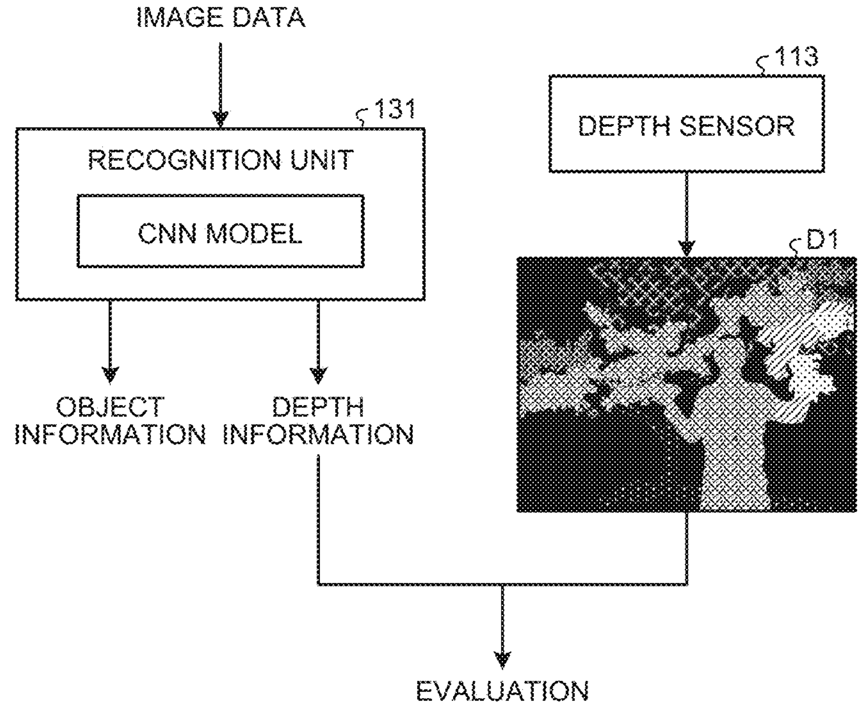
FIG. 7 is a diagram for explaining another example of the evaluation processing according to the embodiment of the present disclosure.

FIG. 7 is a diagram for explaining another example of the evaluation processing according to the embodiment of the present disclosure. In the example illustrated in FIG. 7, the information processing device 100 includes a depth sensor 113 (an example of a distance measuring unit) that generates distance data to a subject.

The depth sensor 113 may be a sensor such as a LiDAR (light detection and ranging). The depth sensor 113 may be a depth sensor other than the LiDAR. The depth sensor 113 may be a distance measuring system using a millimeter wave radar. Besides, the depth sensor 113 may be a TOF sensor or may be a stereo camera.

As illustrated in FIG. 7, the depth sensor 113 reads three-dimensional structure of a peripheral environment and generates distance data D1 (an example of a second distance image).

In addition to the object detection, a CNN model used by the recognition unit 131 is assumed to generate depth information (distance data) from image data. That is, the CNN model is a learning model that receives image data as an input and outputs detected object information and depth information. When the information processing device 100 performs the object detection, the recognition unit 131 outputs, as a result of the object detection, object information output by the CNN model.

On the other hand, when the information processing device 100 evaluates the update data, the recognition unit 131 outputs depth information that is output of the updated CNN model. The information processing device 100 compares the depth information with the distance data D1 generated by the depth sensor 113 and calculates accuracy of the depth information. When the accuracy of the depth information is desired accuracy (for example, equal to or higher than the accuracy at the time of the last update processing), the information processing device 100 determines to apply the update data.

As explained above, when the information processing device 100 evaluates the update data using the distance information, the recognition unit 131 may perform the object detection and the generation of the depth information using a plurality of learning models.

Figure 8:
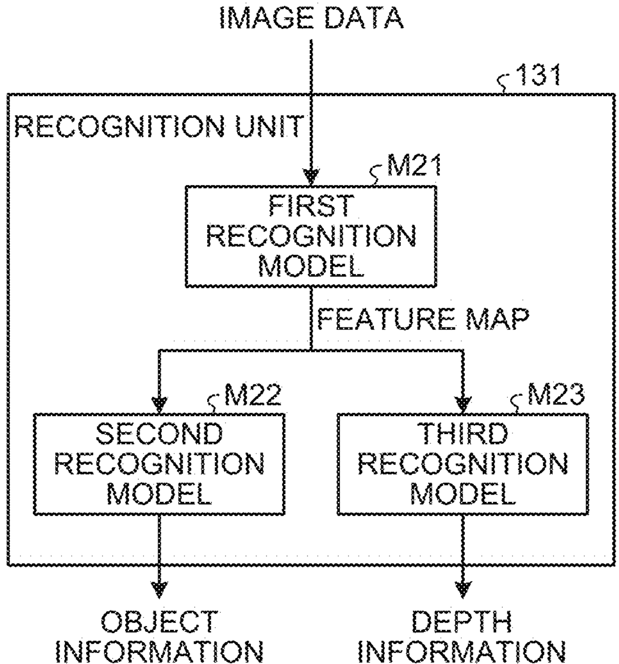
FIG. 8 is a diagram for explaining another example of the evaluation processing according to the embodiment of the present disclosure.

FIG. 8 is a diagram for explaining another example of the evaluation processing according to the embodiment of the present disclosure. In the example illustrated in FIG. 8, the recognition unit 131 generates object information and depth information using a first recognition model M21 to a third recognition model M23 instead of the CNN model.

The recognition unit 131 inputs image data to the first recognition model M21 and acquires a feature map. The feature map is data indicating a feature value of the image data. The recognition unit 131 inputs the feature map to the second recognition model M22 and acquires the object information to perform the object detection. The recognition unit 131 inputs the feature map to the third recognition model M23 and acquires the depth information. Note that a method of the information processing device 100 evaluating the update data using the acquired depth information is the same as the method in the case of FIG. 7.

Note that the information processing device 100 uses the depth information for the evaluation processing here but is not limited to this. For example, the information processing device 100 may use the depth information when generating the update data. That is, in the generation processing, the information processing device 100 uses an error between the depth information and the distance data D1 as an error between a recognition result and a correct answer.

As explained above, the information processing device 100 performs the update processing using the depth information, whereby the information processing device 100 can perform the update processing using correct answer data. In particular, the parameters of the sensor unit 110 are updated to generate an image optimum for image recognition by the recognition unit 131. Therefore, the update processing using the depth information is useful for updating the parameters of the sensor unit 110.

(Evaluation Method 5)

The information processing device 100 can perform the evaluation processing for the update data using data corresponding to a user attribute (or, a category that matches the user) as evaluation data. For example, the information processing device 100 collects evaluation data matching the user based on age, gender, race, an address (a place of use of the information processing device 100), weather, time of use of the information processing device 100, and the like of the user. The information processing device 100 can acquire the evaluation data from, for example, the cloud server. Note that the evaluation method using the evaluation data is the same as the evaluation method 1.

For example, when the user is a teenage woman, the information processing device 100 categorizes the user into a F1 layer and acquires, as the evaluation data, image data with a correct answer label for the F1 layer. Note that it is assumed that image data acquired as the evaluation data by the information processing device 100 is categorized in advance according to the user attribute and the like. It is assumed that a correct answer label is given to the image data in advance or a correct answer label is given at the time of collection like the imaging evaluation data.

As explained above, the information processing device 100 evaluates the update data using the evaluation data matching the user. Accordingly, the information processing device 100 can perform evaluation using evaluation data suitable for the user and can check the accuracy of the update data in a case matching the user.

(Application Processing)

When determining to apply the update data as a result of executing the evaluation processing, the information processing device 100 executes application processing. As the application processing, the information processing device 100 notifies the updated parameters to the sensor unit 110. The information processing device 100 replaces the CNN model used by the recognition unit 131 with the updated CNN model.

Note that, before executing the application processing, the information processing device 100 can inquire of the user whether to execute the application processing. For example, the information processing device 100 can inquire of the user whether presence or absence of update, for example, inquires "A recognition rate is improved to 90%, would you like to update?". When the user agrees to the update, the information processing device 100 executes the application processing and applies the update data.

As explained above, the information processing device 100 applies the update data according to an evaluation result. Accordingly, the information processing device 100 can update the parameters and the CNN model while suppressing degradation in the recognition accuracy.

<<4. Modifications>>

In the embodiment explained above, the information processing device 100 executes the update processing when there is no problem even if power consumption is large, such as during charging, or when there is no problem even if a delay is large. However, the information processing device 100 is not limited to this.

For example, the information processing device 100 may also execute the update processing when there is no problem even if power consumption slightly decreases or a delay occurs. For example, the information processing device 100 executes first update processing when a first update condition and a second update condition are satisfied. The information processing device 100 executes second update processing when the first update condition is satisfied but the second update condition is not satisfied.

Figure 9:
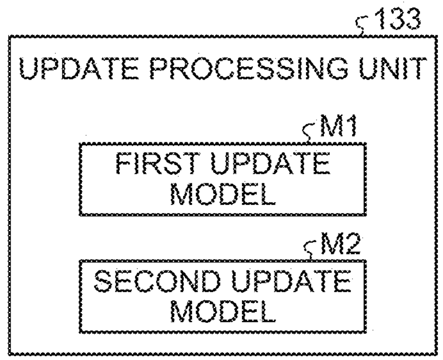
FIG. 9 is a diagram for explaining an update processing unit according to a modification of the embodiment of the present disclosure.

FIG. 9 is a diagram for explaining the update processing unit 133 according to a modification of the embodiment of the present disclosure. As illustrated in FIG. 9, the update processing unit 133 includes a first update model M1 and a second update model M2. The update processing unit 133 executes the first update processing using the first update model M1. The update processing unit 133 executes the second update processing using the second update model M2.

Here, the second update model M2 is, for example, a learning model having smaller structure than the first update model M1. Therefore, the update processing unit 133 can execute the second update processing at higher speed and with lower power consumption compared with the first update processing. Alternatively, the second update model M2 may be a part of the first update model M1. For example, the information processing device 100 creates, from the first update model M1, which is a large network, the second update model M2, which is a small network, according to a device (here, the information processing device 100), an allowable operational amount, a memory size, and the like.

The first update condition includes, for example, a case in which there is no problem even if the power consumption increases to some extent, such as a case in which a residual charge amount is equal to or more than a first threshold or there is no problem even if the residual charge amount is equal to or less than a second threshold, and a case in which there is no problem even if a delay increases to some extent, such as a case in which there is no object to be detected in the periphery. The second update condition includes a case in which there is no problem even if power consumption is large (for example, there is no problem even if a residual charge amount is equal to or less than a third threshold (the third threshold<the second threshold)), such as during charging, and a case in which there is no problem even if the recognition unit 131 does not perform the recognition processing and a large delay occurs.

For example, when performing the update processing while collecting processing data, when the first update condition is not satisfied but the second update condition is satisfied, the information processing device 100 performs the second update processing using an update model (for example, the second update model M2) small enough to perform the update processing. Thereafter, the information processing device 100 performs the first update processing using a large update model (for example, the first update model M1) at timing when the first update condition is satisfied.

Note that the first update processing and the second update processing executed by the information processing device 100 are the same as the update processing according to the embodiment except that the update model used for the update processing is different.

Figure 10:
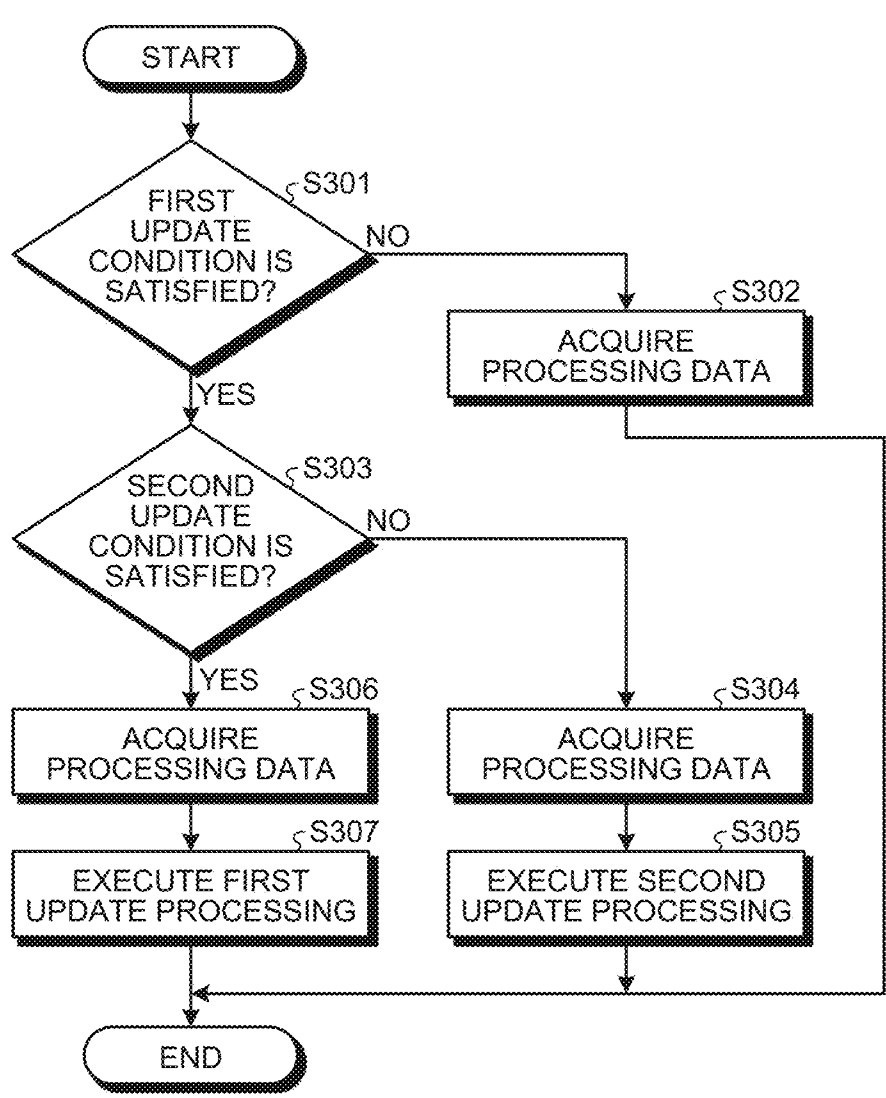
FIG. 10 is a flowchart illustrating an example of a flow of update processing according to the embodiment of the present disclosure.

FIG. 10 is a flowchart illustrating an example of a flow of the update processing according to the embodiment of the present disclosure. The update processing illustrated in FIG. 10 is executed by the information processing device 100, for example, at a predetermined period.

The information processing device 100 determines whether the first update condition is satisfied (Step S301). When the first update condition is not satisfied (Step S301; No), the information processing device 100 acquires processing data (Step S302) and ends the update processing.

When the first update condition is satisfied (Step S301; Yes), the information processing device 100 determines whether the second update condition is satisfied (Step S303).

When the second update condition is not satisfied (Step S303; No), the information processing device 100 acquires processing data (Step S304) and executes the second update processing (Step S305). For example, the information processing device 100 executes the second update processing using the second update model M2.

When the second update condition is satisfied (Step S303; Yes), the information processing device 100 acquires processing data (Step S306) and executes the first update processing (Step S307). For example, the information processing device 100 executes the first update processing using the first update model M1.

As explained above, the information processing device 100 performs the update processing with the update model having size corresponding to a required power consumption amount and a required delay amount. Accordingly, the information processing device 100 can execute the update processing for the parameters and the CNN model while suppressing power consumption and occurrence of a delay. The information processing device 100 performs the update processing using a large update model at timing at which there is no problem even if power consumption increases or a delay increases. Accordingly, the information processing device 100 can further improve the accuracy of image recognition by the recognition unit 131.

Note that the information processing device 100 can select the size of the second update model M2 according to a usage rate of a CPU (or a GPU). For example, the information processing device 100 selects the smaller second update model M2 as the usage rate of the CPU is larger.

Here, the information processing device 100 executes the first update processing and the second update processing. However, the execution of the update processing is not limited to this. For example, when a delay may increase or when other processing cannot be executed when the update processing is performed, an external device such as a cloud server may execute the update processing.

The external device such as the cloud server may execute a part of the update processing. For example, the information processing device 100 may perform processing in which image data captured by the sensor unit 110 is desirably used, such as update of the parameters of the sensor unit 110, and the cloud server may perform processing that can be performed using processing data on the cloud server, such as update of the CNN model.

The information processing device 100 may perform a part of the update processing using a large update model (for example, the first update model M1) and perform the rest using a small update model (for example, the second update model M2). For example, the information processing device 100 can update the parameters of the sensor unit 110 with a high load using the first update model M1. On the other hand, for example, the information processing device 100 can update the CNN model with a low load using the second update model M2.

5. Hardware Configuration

FIG. 11 is a block diagram illustrating an example of a hardware configuration of the information processing device 100 according to the present embodiment. Note that an information processing device 800 illustrated in FIG. 11 can implement, for example, the information processing device 100. Information processing by the information processing device 100 according to the present embodiment is implemented by cooperation of software and hardware explained below.

As illustrated in FIG. 11, the information processing device 800 includes, for example, a CPU 871, a ROM 872, a RAM 873, a host bus 874, a bridge 875, an external bus 876, and an interface 877. The information processing device 800 includes an input device 878, an output device 879, a storage 880, a drive 881, a connection port 882, and a communication device 883. Note that a hardware configuration explained here is an example and a part of the components may be omitted. The hardware configuration may further include components other than the components explained here.

(CPU 871)

The CPU 871 functions as, for example, an arithmetic processing device or a control device and controls all or a part of operations of the components based on various programs recorded in the ROM 872, the RAM 873, the storage 880, or a removable recording medium 901.

Specifically, the CPU 871 implements operation processing in the information processing device 100.

(ROM 872, RAM 873)

The ROM 872 is a unit that stores a program read by the CPU 871, data used for an arithmetic operation, and the like. The RAM 873 temporarily or permanently stores, for example, a program read by the CPU 871 and various parameters that change as appropriate when the program is executed.

(Host Bus 874, Bridge 875, External Bus 876, Interface 877)

The CPU 871, the ROM 872, and the RAM 873 are connected to one another via, for example, the host bus 874 capable of performing high-speed data transmission. On the other hand, the host bus 874 is connected to the external bus 876 having relatively low data transmission speed via, for example, the bridge 875. The external bus 876 is connected to various components via the interface 877.

(Input Device 878)

As the input device 878, for example, a mouse, a keyboard, a touch panel, a button, a switch, and a lever are used.

Further, as the input device 878, a remote controller capable of transmitting a control signal using infrared rays or other radio waves is sometimes used. The input device 878 includes a voice input device such as a microphone.

(Output Device 879)

The output device 879 is a device capable of visually or auditorily notifying acquired information to the user, for example, a display device such as a CRT (Cathode Ray Tube), an LCD, or an organic EL, an audio output device such as a speaker or a headphone, a printer, a mobile phone, or a facsimile. The output device 879 according to the present disclosure includes various vibration devices capable of outputting tactile stimulation.

(Storage 880)

The storage 880 is a device for storing various data. As the storage 880, for example, a magnetic storage device such as a hard disk drive (HDD), a semiconductor storage device, an optical storage device, or a magneto-optical storage device is used.

(Drive 881)

The drive 881 is, for example, a device that reads information recorded on the removable recording medium 901 such as a magnetic disk, an optical disk, a magneto-optical disk, or a semiconductor memory or writes information in the removable recording medium 901.

(Removable Recording Medium 901)

The removable recording medium 901 is, for example, a DVD medium, a Blu-ray (registered trademark) medium, an HD DVD medium, or various semiconductor storage media. Naturally, the removable recording medium 901 may be, for example, an IC card on which a noncontact IC chip is mounted, or electronic equipment.

(Connection Port 882)

The connection port 882 is a port for connecting external connection equipment 902 such as a USB (Universal Serial Bus) port, an IEEE 1394 port, an SCSI (Small Computer System Interface), an RS-232C port, or an optical audio terminal.

(External Connection Equipment 902)

The external connection equipment 902 is, for example, a printer, a portable music player, a digital camera, a digital video camera, or an IC recorder.

(Communication Device 883)

The communication device 883 is a communication device for connecting to a network and is, for example, a communication card for wired or wireless LAN, Wi-Fi (registered trademark), Bluetooth (registered trademark), or WUSB (Wireless USB), a router for optical communication, a router for an ADSL (Asymmetric Digital Subscriber Line), or a modem for various communications.

6. Summary

The preferred embodiment of the present disclosure is explained in detail above with reference to the accompanying drawings. However, the present technique is not limited to such an example. It is evident that those having the ordinary knowledge in the technical field of the present disclosure can arrive at various alterations or corrections within the category of the technical idea described in claims. It is understood that these alterations and corrections naturally belong to the technical scope of the present disclosure.

For example, it is also possible to create a computer program for causing hardware such as the CPU, the ROM, and the RAM incorporated in the information processing device 100 explained above to exhibit the functions of the information processing device 100. A computer-readable storage medium storing the computer program is also provided.

The effects described in the present specification are only explanatory or illustrative and are not limiting. That is, the technique according to the present disclosure can achieve other effects obvious for those skilled in the art from the description of the present specification together with or instead of the effects described above.

Note that the present technique can also take the following configurations.

(1)

An information processing device comprising
a control unit configured to:
recognize, using a learning model, a captured image captured by a sensor unit according to parameters;
collect data to be used for updating at least one of the parameters and the learning model;
update at least one of the parameters and the learning model using the data;
evaluate a recognition result of recognizing the captured image using at least one of the updated parameters and the updated learning model; and
recognize the captured image by applying at least one of the updated parameters and the updated learning model according to a result of the evaluation.

(2)

The information processing device according to (1), wherein the parameters include a parameter concerning at least one of an exposure time, shutter speed, an analog gain, filter processing, and gradation correction of the sensor unit.

(3)

The information processing device according to (1) or (2), wherein the control unit collects the data according to at least one of an environment in which the sensor unit performs imaging, a user who performs imaging, and the own device.

(4)

The information processing device according to any one (1) to (3), wherein the control unit collects the data by changing at least one of the parameters of the sensor unit and a state of the own device.

(5)

The information processing device according to any one (1) to (4), wherein the control unit updates at least one of the parameters and the learning model at timing corresponding to at least one of power of the own device and a delay required for the recognition.

(6)

The information processing device according to any one (1) to (5), wherein the control unit performs first update on at least one of the parameters and the learning model at the timing when a first condition is satisfied and performs second update on at least one of the parameters and the learning model at the timing when a second condition is satisfied.

(7)

The information processing device according to (6), wherein the control unit performs the first update using a first learning model and performs the second update using a second learning model larger than the first learning model.

(8)

The information processing device according to any one (1) to (7), wherein the control unit evaluates at least one of the updated parameters and the updated learning model using evaluation data corresponding to at least one of an environment in which the sensor unit performs imaging and a user who performs imaging.

(9)

The information processing device according to (8), wherein the evaluation data is image data captured by the sensor unit and is the image data including correct answer information.

(10)

The information processing device according to (8), wherein the control unit evaluates a second recognition result based on a first recognition result obtained by recognizing the evaluation data by a server-side learning model generated by a server device using the data and the second recognition result obtained by recognizing the evaluation data using at least one of the updated parameters and the updated learning model.

(11)

The information processing device according to (10), wherein the server-side learning model has same structure as the learning model or larger structure than the learning model.

(12)

The information processing device according to any one (1) to (7), wherein the control unit generates a first distance image from the captured image using the learning model and evaluates the recognition result based on the first distance image generated from the captured image using at least one of the updated parameters and the updated learning model and a second distance image generated by a distance measuring unit.

(13)

An information processing method comprising:

recognizing, using a learning model, a captured image captured by a sensor unit according to parameters;

collecting data to be used for updating at least one of the parameters and the learning model;

updating at least one of the parameters and the learning model using the data;

evaluating a recognition result of recognizing the captured image using at least one of the updated parameters and the updated learning model; and recognizing the captured image by applying at least one of the updated parameters and the updated learning model according to a result of the evaluation.

(14)

A program for causing a processor to execute:

a step of recognizing, using a learning model, a captured image captured by a sensor unit according to parameters;

a step of collecting data to be used for updating at least one of the parameters and the learning model;

a step of updating at least one of the parameters and the learning model using the data;

a step of evaluating a recognition result of recognizing the captured image using at least one of the updated parameters and the updated learning model; and a step of recognizing the captured image by applying at least one of the updated parameters and the updated learning model according to a result of the evaluation.

REFERENCE SIGNS LIST

100 INFORMATION PROCESSING DEVICE
110 SENSOR UNIT
120 COMMUNICATION UNIT
130 CONTROL UNIT
131 RECOGNITION UNIT
132 DATA COLLECTION UNIT
133 UPDATE PROCESSING UNIT
134 TIMING DETERMINATION UNIT
140 INPUT/OUTPUT UNIT
150 STORAGE UNIT

The invention claimed is:

1. An information processing device, comprising:

a control unit configured to:

control a sensor unit to capture an image based on a set of parameters of the sensor unit;

recognize the captured image based on a set of learning models;

collect data to update at least one of the set of learning models or the set of parameters;

update the at least one of the set of learning models or the set of parameters based on the data;

generate a first distance image from the captured image based on the updated set of learning models;

control a distance measuring unit to generate a second distance image;

evaluate a recognition result based on the first distance image, the second distance image, and the at least one of the updated set of parameters or the updated set of learning models, wherein the recognition result is associated with the recognition of the captured image; and recognize the captured image with the at least one of the updated set of parameters or the updated set of learning models, based on the evaluation of the recognition result.

2. The information processing device according to claim 1, wherein the set of parameters includes at least one of an exposure time, a shutter speed, an analog gain, a filter processing operation, or gradation correction of the sensor unit.

3. The information processing device according to claim 1, wherein the control unit is further configured to collect the data based on at least one of an environment of the sensor unit, an attribute of a user, or specification of the information processing device, the sensor unit captures the image in the environment, and the sensor unit captures the image based on a user input associated with the user.

4. The information processing device according to claim 1, wherein the control unit is further configured to collect the data based on change of at least one of a state of the information processing device or the set of parameters of the sensor unit.

5. The information processing device according to claim 1, wherein the control unit is further configured to update the at least one of the set of parameters or the set of learning models model at a specific time, and the specific time corresponds to at least one of power of the information processing device or a delay for the recognition.

6. The information processing device according to claim 5, wherein the control unit is further configured to:

execute a first update process on the at least one of the set of parameters or the set of learning models at a first time instant, wherein the first update process is executed at the first time instant based on a first condition; and execute a second update process on the at least one of the set of parameters or the set of learning models at a second time instant, wherein the second update process is executed at the second time instant based on a second condition.

7. The information processing device according to claim 6, wherein the control unit is further configured to:

execute the first update process based on a first learning model of the set of learning models; and execute the second update process based on a second learning model of the set of learning models, wherein the second learning model is larger than the first learning model.

8. The information processing device according to claim 1, wherein the control unit is further configured to evaluate the at least one of the updated set of parameters or the updated set of learning models based on evaluation data, the evaluation data corresponds to at least one of an environment of the sensor unit or an attribute of a user, the sensor unit captures the image in the environment, and the sensor unit captures the image based on a user input associated with the user.

9. The information processing device according to claim 8, wherein the evaluation data includes image data captured by the sensor unit, and the image data includes correct answer information associated with recognition of the image data.

10. The information processing device according to claim 8, wherein the control unit is further configured to:

obtain a first recognition result based on recognition of the evaluation data by a server-side learning model, wherein the first recognition result is different from the recognition result, and the server-side learning model is generated by a server device based on the data;

recognize the evaluation data based on the at least one of the updated set of parameters or the updated set of learning models;

generate a second recognition result based on the recognition of the evaluation data, wherein the second recognition result corresponds to the recognition result; and evaluate the second recognition result based on the first recognition result.

11. The information processing device according to claim 10, wherein a structure of the server-side learning model is one of same as a structure of the set of learning models or larger than the structure of the set of learning models.

12. An information processing method, comprising:

controlling a sensor unit to capture an image based on a set of parameters of the sensor unit;

recognizing the captured image based on a set of learning models;

collecting data to update at least one of the set of learning models or the set of parameters;

updating the at least one of the set of learning models or the set of parameters based on the data;

generating a first distance image from the captured image based on the updated set of learning models;

controlling a distance measuring unit to generate a second distance image;

evaluating a recognition result based on the first distance image, the second distance image, and the at least one of the updated set of parameters or the updated set of learning models, wherein the recognition result is associated with the recognition of the captured image; and recognizing the captured image with the at least one of the updated set of parameters or the updated set of learning models, based on the evaluation of the recognition result.

13. A non-transitory computer-readable medium having stored thereon, computer-executable instructions which, when executed by a processor, cause the processor to execute operations, the operations comprising:

controlling a sensor unit to capture an image based on a set of parameters of the sensor unit;

recognizing the captured image based on a set of learning models;

collecting data to update at least one of the set of learning models or the set of parameters;

updating the at least one of the set of learning models or the set of parameters based on the data;

generating a first distance image from the captured image based on the updated set of learning models;

controlling a distance measuring unit to generate a second distance image;

evaluating a recognition result based on the first distance image, the second distance image, and the at least one of the updated set of parameters or the updated set of learning models, wherein the recognition result is associated with the recognition of the captured image; and recognizing the captured image with the at least one of the updated set of parameters or the updated set of learning models based on the evaluation of the recognition result.

* * * * *